United States Patent
Takahashi et al.

(10) Patent No.: US 9,007,884 B2
(45) Date of Patent: Apr. 14, 2015

(54) OPTICAL RECORDING MEDIUM

(75) Inventors: Kensaku Takahashi, Kanagawa (JP); Takeshi Miki, Tokyo (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/126,996

(22) PCT Filed: Jun. 29, 2012

(86) PCT No.: PCT/JP2012/066648
§ 371 (c)(1),
(2), (4) Date: Dec. 17, 2013

(87) PCT Pub. No.: WO2013/005660
PCT Pub. Date: Jan. 10, 2013

(65) Prior Publication Data
US 2014/0119170 A1    May 1, 2014

(30) Foreign Application Priority Data
Jul. 7, 2011    (JP) ................................. 2011-151196

(51) Int. Cl.
*G11B 7/24*     (2013.01)
*G11B 7/007*    (2006.01)
*G11B 7/24079*  (2013.01)

(52) U.S. Cl.
CPC ........ *G11B 7/00718* (2013.01); *G11B 7/24079* (2013.01)

(58) Field of Classification Search
CPC ...... G11B 7/007; G11B 7/24079; G11B 7/00; G11B 7/24082; G11B 7/263; G11B 7/24; G11B 7/246; G11B 7/2467; G11B 7/0045; G11B 7/2531; G11B 7/2533; G11B 7/00745; G11B 7/00718; G11B 2005/0005
USPC ........ 369/275.3, 273.4, 275.5, 277, 288, 283; 430/270.16, 271.11, 270.2
See application file for complete search history.

(56) References Cited

U.S. PATENT DOCUMENTS 7,129,019 B2 * 10/2006 Kakuta et al. ............ 430/270.16
7,548,505 B2 *  6/2009 Endoh et al. ............... 369/275.4

FOREIGN PATENT DOCUMENTS

JP          08-306080       11/1996
JP          H11-259911 A     9/1999
(Continued)

OTHER PUBLICATIONS

Japanese Office Action issued on Sep. 24, 2014 in patent application No. 2011-151196.
(Continued)

*Primary Examiner* — Ali Neyzari
(74) *Attorney, Agent, or Firm* — Sony Corporation

(57) ABSTRACT

The present technology relates to an optical recording medium for realizing an optical recording medium capable of high-capacity recording. A groove and a land are formed, the groove being concave and the land being convex when seen from a side of a laser light incident surface, both of the groove and the land being recording tracks where recording or reproduction of information is performed. According to this recording layer, a pitch between the groove and the land that are adjacent recording tracks is within a range of 250 nm to 200 nm. Moreover, recording or reproduction of information is performed with respect to the recording tracks by irradiation of laser light whose wavelength is 400 nm to 415 nm by an optical system whose NA is 0.85±0.1.

15 Claims, 15 Drawing Sheets

(56) References Cited

FOREIGN PATENT DOCUMENTS

| | | |
|---|---|---|
| JP | 2002-203340 A | 7/2002 |
| JP | 2002-334484 A | 11/2002 |
| JP | 2003-157543 | 5/2003 |
| JP | 2003-346379 A | 12/2003 |
| JP | 2004-013947 A | 1/2004 |
| JP | 2005-116058 | 4/2005 |
| JP | 2005-174423 | 6/2005 |
| JP | 2006-236421 A | 9/2006 |
| JP | 2006-252671 A | 9/2006 |
| JP | 2006-344348 A | 12/2006 |
| JP | 2007-073117 | 3/2007 |
| JP | 2007-172717 | 7/2007 |
| JP | 2007-265593 | 10/2007 |
| JP | 2007-528575 A | 10/2007 |
| JP | 2009-070487 | 4/2009 |
| WO | 2006/001131 A1 | 1/2006 |

OTHER PUBLICATIONS

Japanese Office Action issued on Dec. 24, 2014 in patent application No. 2011-151196.

* cited by examiner

FIG. 4
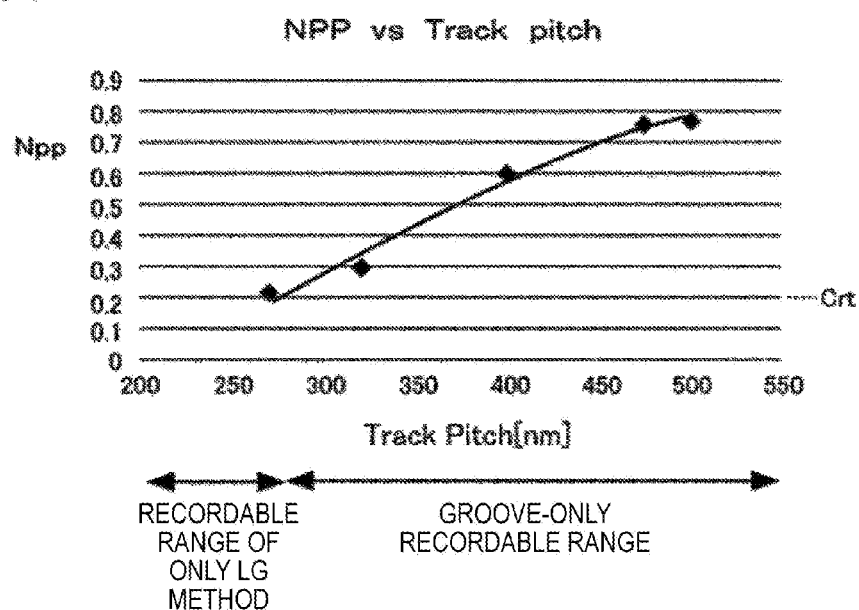
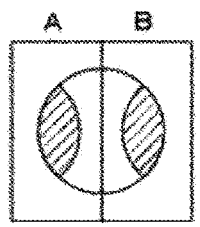

OPTICAL RECORDING MEDIUM

CROSS REFERENCES TO RELATED APPLICATIONS

The present application is a national stage of International Application No. PCT/JP2011/066648 filed on Jun. 29, 2012 and claims priority to Japanese Patent Application No. 2011-151196 filed on Jul. 7, 2011, the disclosure of which is incorporated herein by reference.

BACKGROUND

The present disclosure relates to an optical recording medium such as an optical disc, for example.

Various reproduction-only discs and recordable discs (a write-once disc, a rewritable disc) are developed under the category of a CD (Compact Disc), a DVD (Digital Versatile Disc), a Blu-ray Disc (registered trademark), and the like.

In the field of such optical discs, for example, a further increase in the capacity based on high density recording is being sought with respect to next-generation discs.

SUMMARY

Problems to be Solved by the Invention

For example, as a trend of high density recording by a disc-shaped recording medium, increasing the number of recording layers, increasing the recording density in the track line density, increasing the recording density in the track pitch direction (reducing the track pitch), increasing the recording capacity by signal processing such as data compression processing, and the like may be assumed.

In order to further the high density recording by each of the aspects, feasibility of appropriately executing recording/reproduction should be taken into account.

The object of the present disclosure is to provide an optical recording medium capable of realizing a further increase in the capacity based on high density recording within a range allowing appropriate execution of recording/reproduction.

Solutions to Problems

An optical recording medium of the present disclosure includes: a recording layer on which a groove and a land are formed, the groove being concave and the land being convex when seen from a side of a laser light incident surface, both of the groove and the land being recording tracks where recording or reproduction of information is performed by irradiation of laser light whose wavelength is 400 nm to 415 nm by an optical system whose NA is 0.85±0.1, wherein a pitch between the groove and the land that are adjacent recording tracks is within a range of 250 nm to 200 nm.

Further, it is preferable that a depth of the groove with respect to the land is within a range of 30 nm to 5 nm when seen from the side of the laser light incident surface.

Furthermore, it is preferable that, in a case a duty of a cross-sectional concavo-convex pattern of the groove and the land is {(land width)/(pitch between grooves)}×100, the duty is within a range of 50 to 5.

The optical recording medium of the present disclosure as described above adopts a land/groove recording method of recording information in both the land and the groove. In this case, the pitch between a groove and a land, as recording tracks, that are adjacent to each other (that is, the track pitch according to the land/groove recording method) is within the range of 250 nm to 200 nm. The pitch between grooves is within the range of 500 nm to 400 nm.

In the case of recording only in the groove, 250 nm is about the limit where tracking servo is enabled when taking the track pitch (the pitch between the grooves according to a groove recording method) into account. Accordingly, the land/groove recording method is adopted, and a recording track pitch of 250 nm or less is realized. In this case, the pitch between the grooves may be within the range of 500 nm to 400 nm as described above, and tracking servo may be normally performed.

Now, as the track pitch is reduced, the quality of a reproduction signal is reduced due to cross-talk from an adjacent track or the like. The lower limit of the pitch of the recording tracks where the quality of a reproduction signal may be maintained is 200 nm.

Effects of the Invention

According to the present disclosure, an optical recording medium capable of recording with higher capacity compared with a conventional optical recording medium may be realized.

Additional features and advantages are described herein, and will be apparent from the following Detailed Description and the figures.

BRIEF DESCRIPTION OF THE FIGURES

FIGS. 4A through 4C is an explanatory diagram of an upper limit of a track pitch of the embodiment.

DETAILED DESCRIPTION

Hereinafter, an embodiment of the present disclosure will be described in the following order.

<1. Structure of Optical Disc>
<2. Track Pitch>
<3. Groove Depth>
<4. Land/Groove Duty>
<5. Wobbling Amplitude>
<6. Disc Drive Device>
<7. Manufacturing Process of Optical Disc>
<8. Example Modification>

Additionally, terms used in the present specification are used in the following meaning.

Groove and Land

In the present embodiment, of the concavo-convex pattern of a recording layer of an optical recording medium, the portion which is concave when seen from the side of a laser light incident surface is a groove, and the portion which is convex is a land. That is, the back side, seen from the laser light incident surface, of the concavo-convex pattern is called a groove.

Groove Pitch

The distance between the center of a groove and a center of an adjacent groove is a groove pitch. Additionally, if the distance between the center of a land and the center of an adjacent land is taken as a land pitch, the land pitch is equal to the groove pitch.

L/G Pitch (Land/Groove Pitch)

The distance between the center of a groove and the center of an adjacent land is an L/G pitch.

Track Pitch.

Refers to the pitch between recording tracks. In the present embodiment, both the land and the groove are made the recording tracks, and thus, the track pitch is equal to the L/G pitch. However, in the case of referring to an optical disc adopting a groove recording method where the land is not used as the recording track, the track pitch is equal to the groove pitch. Moreover, for the sake of description, the groove pitch is sometimes specifically referred to as the track pitch.

Groove Depth

The vertical distance from the upper surface of a land to the bottom surface of a groove, seen from the laser light incident surface, is a groove depth.

Duty

Refers to the proportion with respect to the cross-sectional concavo-convex pattern of the grooves and the lands seen in the disc radial direction.

Duty={(land width)/(groove pitch)}×100 is true.

<1. Structure of Optical Disc>

An optical recording medium of the embodiment is, for example, an optical disc with a diameter of 12 cm, such as a CD, a DVD, a Blu-ray disc (BD), or the like.

Moreover, as the laser for recording/reproduction, a so-called blue laser (wavelength λ=approximately 400 to 415 nm) is used, and an optical system is high-NA (for example, NA=0.85±0.1). About 50 GB (Giga Byte) per recording layer is realized under these conditions and with the structure described below.

Figure 1:
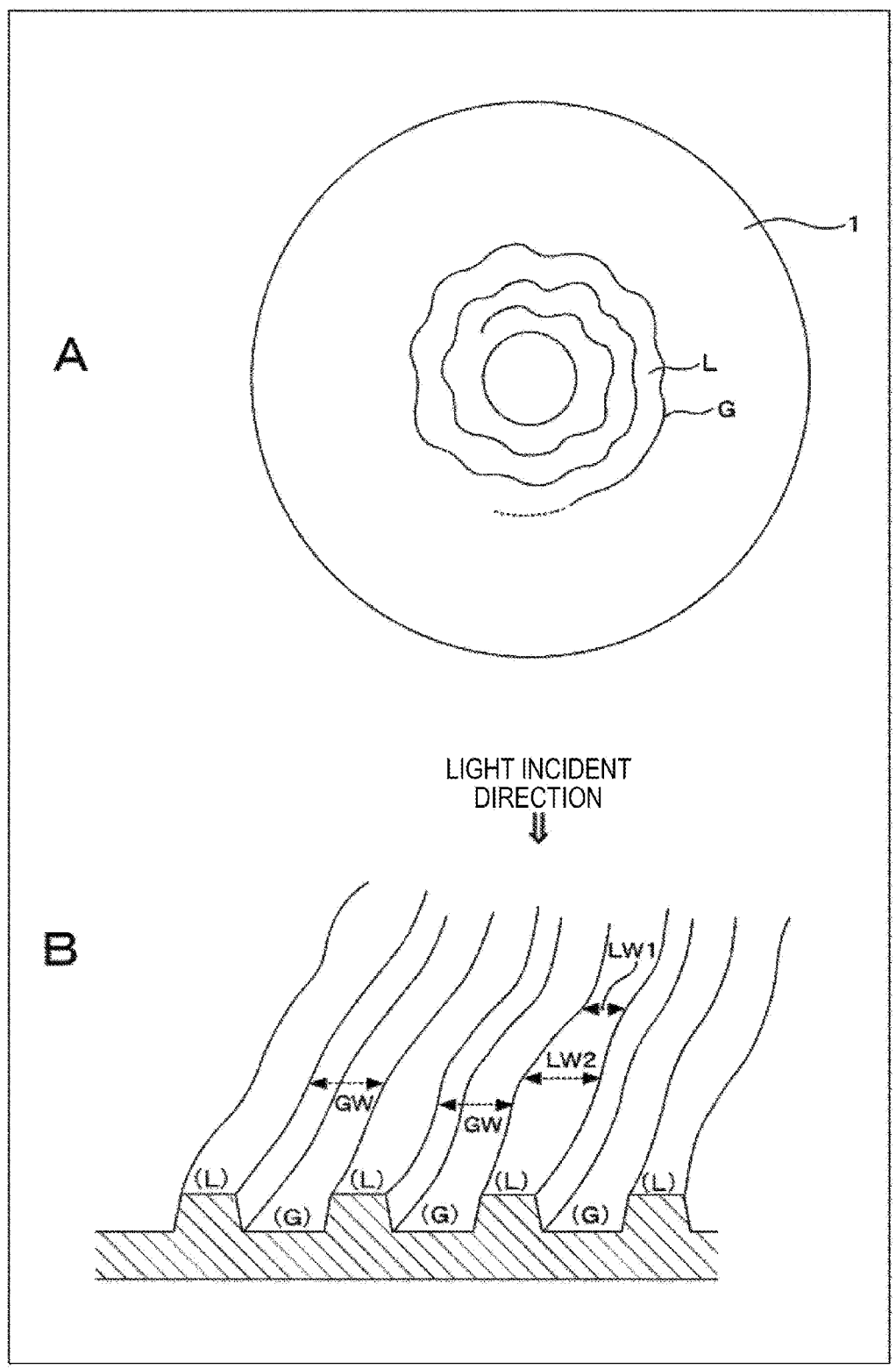
FIGS. 1A and 1B is an explanatory diagram of land/groove of an optical disc of an embodiment of the present disclosure.

FIG. 1 schematically shows the groove of an optical disc 1 of the embodiment.

As shown in A of FIG. 1, a meandering groove G (a wobbling groove) is spirally formed on the optical disc 1.

Between the grooves G is a land L.

The structures of the groove G and the land L arranged in the disc radial direction are shown in an enlarged manner in B of FIG. 1. The groove G is on the back side when seen from the laser light incident direction. Then, the land L is formed between the grooves G arranged in the radial direction.

The groove G is wobbled according to a signal which is address information or the like which has been modulated. Thus, the address information or the like may be directly reproduced from the groove G itself.

In the manufacturing procedure (original disc mastering) of the optical disc 1, the pattern of the wobbling groove is formed by laser light irradiation. Accordingly, a width GW of the groove G on the optical disc 1 is constant. On the other hand, the wobbling states of adjacent grooves G are not the same, and the width of the land L is varied. For example, land widths LW1 and LW2 shown in the drawing have different values.

Figure 2:
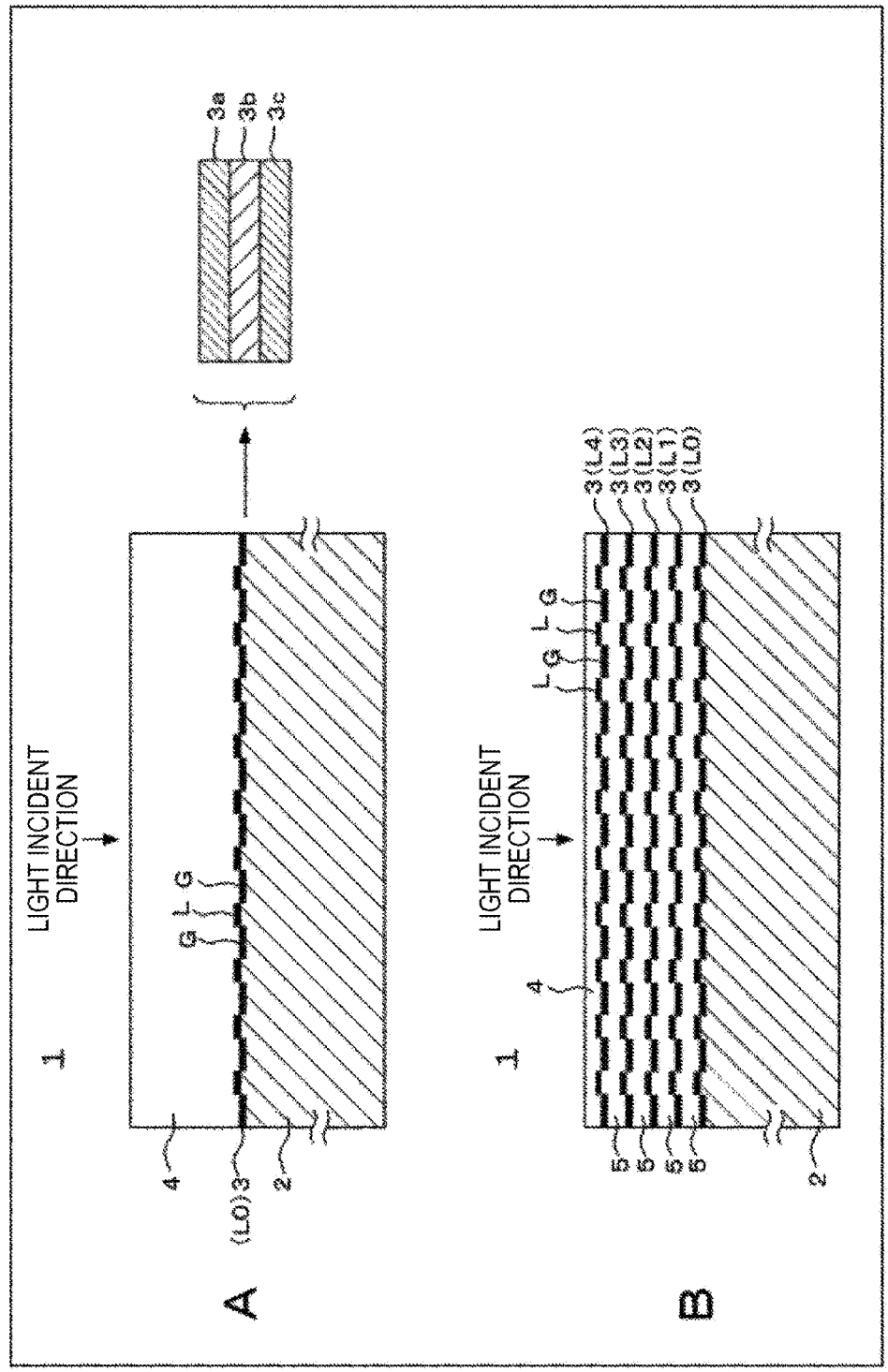
FIGS. 2A and 2B is an explanatory diagram of a layer structure of an optical disc of the embodiment.

FIG. 2 schematically shows the layer structure of the optical disc 1.

In FIG. 2, A is an example of a single-layer disc with one recording layer 3, and B is an example of a multi-layer disc with a plurality of recording layers 3.

As shown in A of FIG. 2, the optical disc 1 has a recording layer 3 (a layer L0) formed on a resin substrate (a disc substrate 2) of polycarbonate or the like with a thickness of about 1.1 mm, for example.

At the time of forming the disc substrate 2, a concavo-convex pattern to be the groove G and the land L is formed on one surface and a recording layer 3 is formed on the surface by sputtering or the like such that the groove G and the land L are provided to the recording layer 3.

For example, the recording layer 3 has a structure where a dielectric film 3a, a recording film 3b, and a dielectric film 3c are stacked. The recording film 3b is altered by heat to form a mark. The dielectric films 3a and 3c serve to control heat transfer. Moreover, the structure of the recording layer 3 shown is only an example, and a structure where the dielectric film is only on one side of the recording film, or a case where other functional layers are provided is also conceivable, for example.

A cover layer 4 of UV curable resin or the like is formed on the upper surface of the recording layer 3. The thickness of the cover layer 4 is about 75 to 100 μm, for example. The thickness of the cover layer 4 is about 100 μm due to taking spherical aberration into account in the case where the laser light wavelength is about 405 nm and the NA of the optical system is about 0.85.

The top surface side of the cover layer 4 is the light incident surface where the laser light enters at the time of recording/reproduction. That is, the laser light enters from the top surface side of the cover layer 4, and forms a spot by being focused on the recording layer 3 (the layer L0), and recording or reproduction is performed.

In the case of a multi-layer disc, as shown in B of FIG. 2, a plurality of recording layers 3 are formed across intermediate layers 5. That is, a plurality of recording layers 3 are provided at different depth positions when seen from the laser light incident surface.

Here, an example where five recording layers 3, layers L0 to L4, are provided is shown, but the number of recording layers may of course be various. A disc with two or more recording layers 3 is called a multi-layer disc. As a matter of course, the recording capacity may be greatly increased by providing a large number of recording layers.

Each of the recording layers 3 (L0 to L4) has a land/groove pattern.

Examples in FIG. 2 are merely examples. Other example structures are also conceivable as the layer structure of the optical disc 1 of the embodiment.

A recordable disc (a write-once disc or a rewritable disc) is described as the optical disc 1 of the embodiment, but a reproduction-only disc is also conceivable.

In the case of a reproduction-only disc, embossed pit arrays are formed on the recording layer 3.

In the case of an optical disc 1 which is a recordable disc, laser light irradiation for recording is performed in a state where the disc is being rotated by a recording device, and a mark array according to recorded information is formed on the recording layer 3. As the mark, a phase change mark, a pigment change mark, an interference mark, a void (hole) mark, a refractive-index mark and the like are conceivable.

At the time of reproduction of the optical disc 1, laser light for reproduction is irradiated on the recording layer 3 to be reproduced in a state where the optical disc 1 is being rotated by a reproduction device. Then, reflected light information according to the mark array formed on the recording layer 3 in question is detected, and the data is reproduced.

According to the optical disc 1 of the embodiment, the land/groove structure of the recording layer 3 is specified as follows.

First, both the land L and the groove G are used as recording tracks for information recording. That is, the land/groove recording method is adopted.

Figure 3:
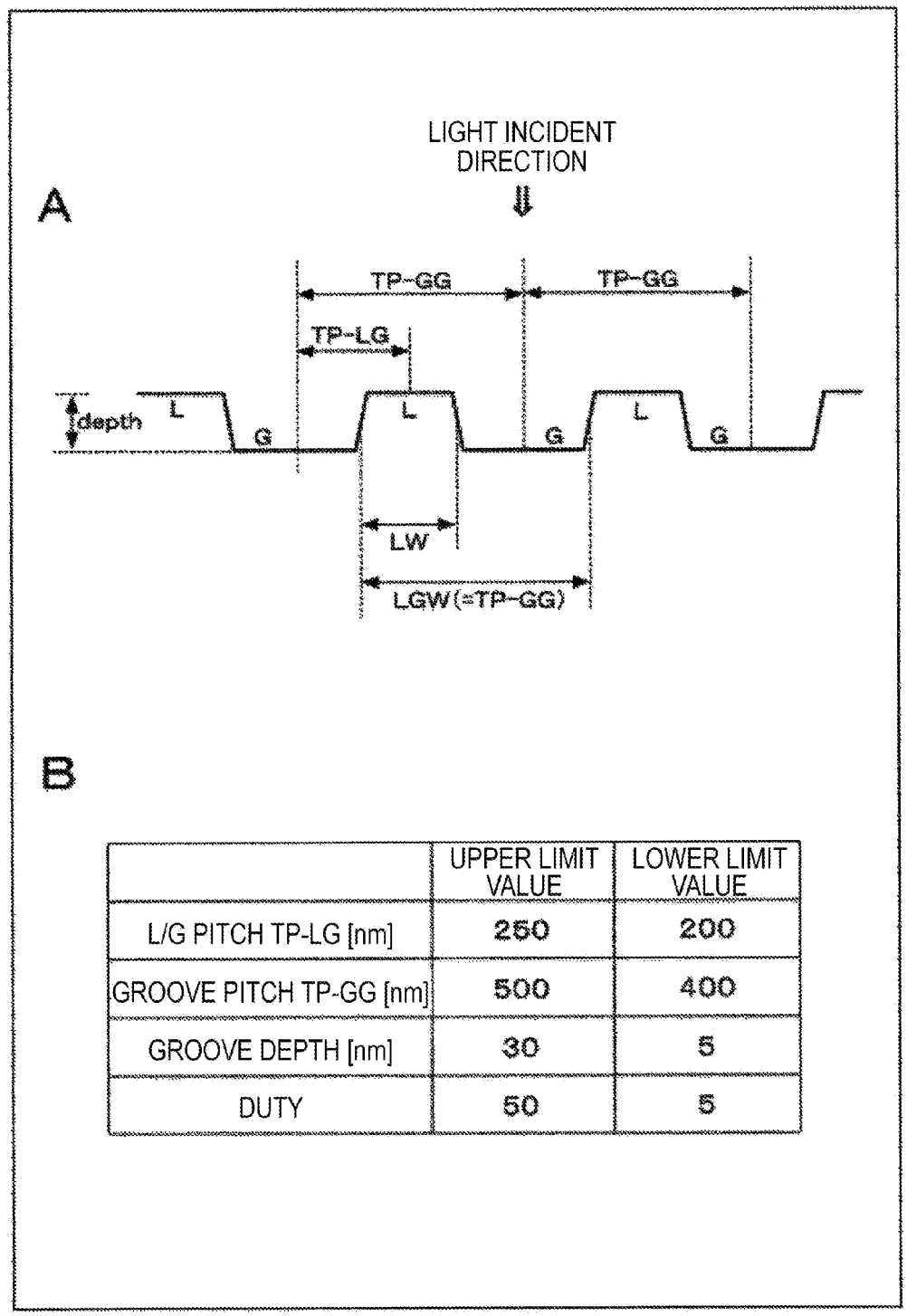
FIGS. 3A and 3B is an explanatory diagram of a land/groove structure of an optical disc of the embodiment.

Then, each value is specified as shown in FIG. 3.

A land/groove structure seen cross-sectionally in the disc radial direction is shown in A of FIG. 3, and a groove pitch TP-GG, an L/G pitch TP-LG, and a groove depth (depth) are shown. Also, a land width LW and a land/groove width LGW (=groove pitch TP-GG) for determining the duty is shown.

Additionally, as shown in the drawing, the land width LW is a so-called half width. That is, it is an intermediate value of the width of the top side and the width of the bottom side of the land L which is cross-sectionally trapezoidal.

The upper limit values and the lower limit values are shown in B of FIG. 3.

Since the present example adopts the land/groove recording method, the L/G pitch TP-LG is the recording track pitch. This L/G pitch TP-LG is set within the range of 250 nm to 200 nm. The groove pitch TP-GG is twice the L/G pitch TP-LG, and is thus within the range of 500 nm to 400 nm.

The groove depth (depth) is set within the range of 30 nm to 5 nm.

The duty of the land/groove structure is set within the range of 50 to 5.

The optical disc 1 of the present embodiment formed within the numerical values described above is a recording medium with the capacity of about 50 GB per recording layer. Of course, in the case of a five-layer structure as shown in B of FIG. 2, a capacity of about 250 GB may be realized.

<2. Track Pitch>

The upper limit values and the lower limit values shown in B of FIG. 3 mentioned above will now be described. Here, the range of the track pitch (the L/G pitch TP-LG) being 250 nm to 200 nm will be described. This is 500 nm to 400 nm in terms of the groove pitch TP-GG.

The reason the upper limit of the L/G pitch TP-LG is 250 nm (500 nm for the groove pitch TP-GG) will be described with reference to FIG. 4.

A of FIG. 4 shows a result of studying an NPP value with respect to the track pitch in a case of the groove recording method, that is, in a case where the land is not used as the recording track and recording is performed only in the groove.

The track pitch of the horizontal axis in this case corresponds to the groove pitch TP-GG.

Furthermore, the NPP value is the ratio of the amount of reflected light to a push-pull signal level. Reception of the reflected laser light from the optical disc by bisected photodetectors (A, B) is shown in C of FIG. 4. The shaded portions are ranges where zero-order light and ±1-order diffraction light overlap each other, and the overlapped portions are the modulation portions. That is, the difference in contrast detected by the photodetector is greater as the area of the overlapped portion shown as the shaded portion is larger, and thus, great signal modulation may be achieved.

When the signals obtained by the bisected photodetectors A and B are expressed as A and B, the following is true:

$$NPP \text{ value} = (A-B)/(A+B).$$

This NPP value becomes great when the track pitch is increased. Also, it is an index for a modulation component of a push-pull signal, and if the modulation signal component of the push-pull signal is reduced, application of the tracking servo becomes difficult to that extent. The NPP value of 0.2 is the minimum value where the reliability of the tracking servo may be secured. Accordingly, evaluation is performed with the NPP value of 0.2 as a criterion Crt.

Additionally, in the study, the NA is 0.85, the laser wavelength λ is 405 nm, the groove depth is 20 nm, and the duty is 50, as shown in B of FIG. 4.

When the NPP value with respect to the track pitch is studied for the groove recording method, the result is the track pitch falling below the criterion Crt near 250 nm, as shown in A of FIG. 4.

That is, it can be said that, in the case of increasing the capacity by reducing the track pitch, the limit of the track pitch (the groove pitch TP-GG) is 250 nm for the groove recording method.

If the groove pitch TP-GG cannot be reduced less than 250 nm, the land/groove recording method has to be adopted as in the present embodiment in order to further reduce the pitch of the recording tracks and to increase the capacity.

In A of FIG. 4, the range where the track pitch is at or below 250 nm is made the range where recording is possible only by the land/groove recording method, and that the track pitch is 250 nm means that, in the case of the land/groove recording method, the groove pitch TP-GG is 500 nm. If the groove pitch TP-GG is 500 nm, the NPP value is sufficiently high, and there is no issue concerning the tracking servo.

Accordingly, in the present embodiment, the land/groove recording method is adopted, and also, the upper limit of the track pitch (that is, in this case, the L/G pitch TP-LG) is made 250 nm. In other words, the L/G pitch TP-LG of 250 nm (the groove pitch TP-GG of 500 nm) is the upper limit where the advantage of reducing the track pitch by adopting the land/groove recording method may be obtained.

Additionally, in the actual recording, when the groove pitch TP-GG is about 500 nm, the track width of the groove G (the concave portion) starts exceeding 250 nm. If the duty is 60, a recording mark has to be formed in a groove with a width of 300 nm. Although a mark to be recorded is dependent also on the recording mechanism and a general statement cannot be made, it is generally recorded/formed by heat.

A track with a width of 300 nm is a track which is extremely wide in the radial direction, and heat is easily transferred in a lateral direction. That is, heat necessary for recording mark formation escapes to the side, and a great recording power may become necessary to form a mark.

In the case of recording in a multi-layer disc using a disc substrate whose groove pitch TP-GG is 500 nm, extremely high power is possibly necessary to record in the deepest layer from the laser incident side (the layer L0). Accordingly, the maximum groove pitch TP-GG is preferably about 480 nm (the L/G pitch TP-LG is 240 nm) for a multi-layer disc with a high capacity.

Next, the lower limit as to how far the track pitch may be reduced is studied. Description is given with reference to FIG. 5.

With the land/groove recording method, if the L/G pitch TP-LG is reduced, a leakage noise from an adjacent recording track occurs, and the reproduction signal is significantly degraded (SER (Symbol Error Rate) reduction). A case where the L/G pitch TP-LG is reduced with respect to a laser spot SP is shown in C of FIG. 5, and as shown in the drawing, adjacent recording tracks are included in the laser spot SP. Thus, a signal of an adjacent track leaks into a reproduction signal obtained from reflected light (cross-talk).

Thus, the relationship of a track pitch and the SER is studied.

Figure 5:
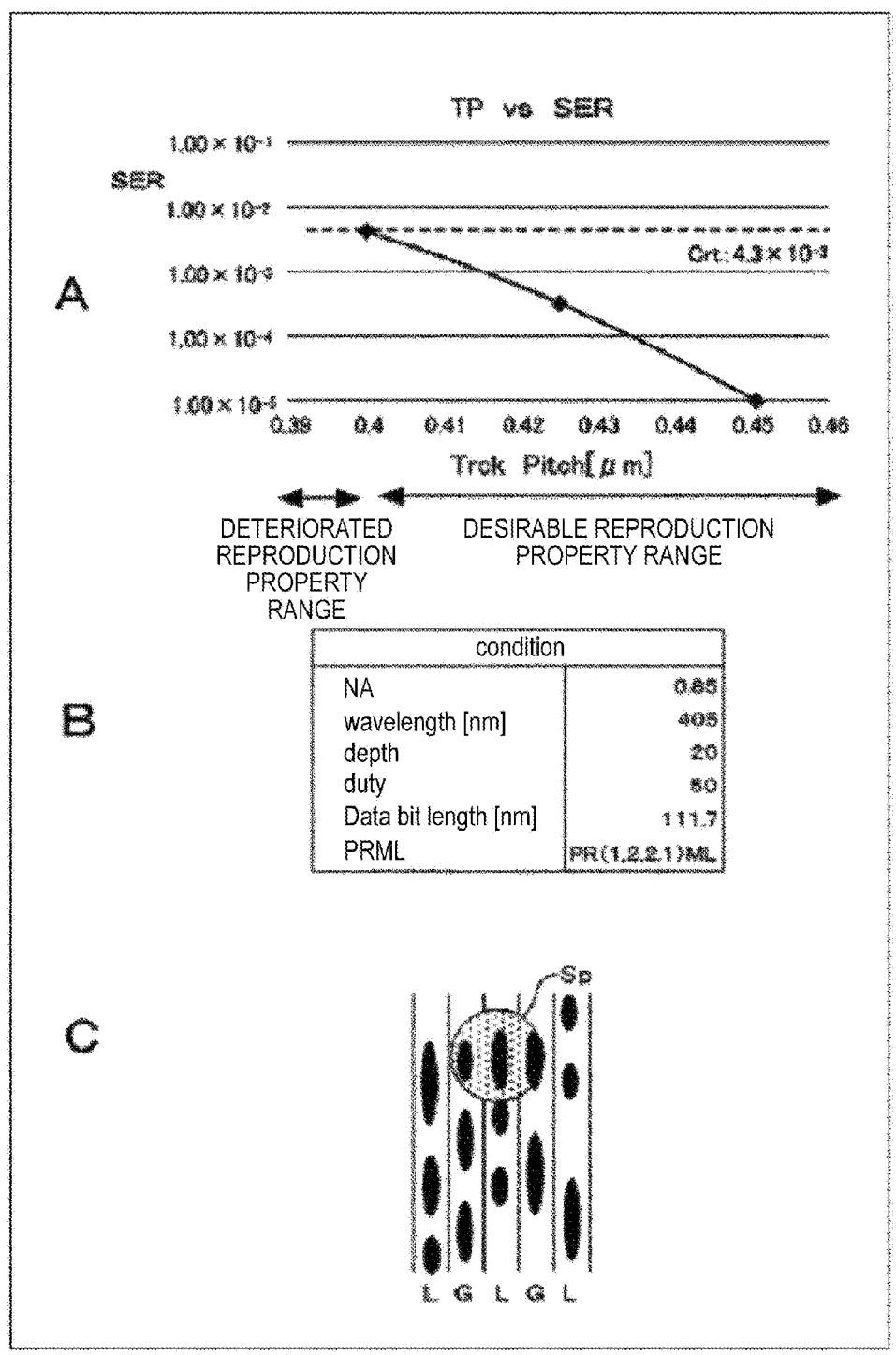
FIGS. 5A through 5C is an explanatory diagram of a lower limit of a track pitch of the embodiment.

The result of measurement of the SER with respect to a track pitch is shown in A of FIG. 5. The track pitch of the horizontal axis is shown as the groove pitch TP-GG.

Furthermore, the conditions at the time of measurement are, as shown in B of FIG. 5, the NA=0.85, the laser wavelength $\lambda$=405 nm, the groove depth=20 nm, the duty=50, and data bit length=111.7, and PR(1,2,2,1)ML is used as a partial response decoding process.

As the criterion Crt, SER=$4.3 \times 10^{-3}$ is established. This is the ECC criterion specified by a Blu-ray disc system, and is a threshold according to which the probability of being uncorrectable is sufficiently low, and the reproduction quality can be guaranteed.

As can be seen from A of FIG. 5, when the track pitch (the groove pitch TP-GG) reaches or falls below 0.4 μm (400 nm), the criterion Crt is exceeded.

Accordingly, the lower limit of the groove pitch TP-GG is appropriately made 400 nm. That is, the lower limit of the track pitch (L/G pitch TP-LG) according to the land/groove recording method is 200 nm.

Additionally, with the actual recording with a high capacity, the density in the linear density direction (the track line direction) is also increased. The data bit length is expected with certainty to fall below 90 nm. That is, the S/N (Signal to Noise Ratio) in the line direction is degraded. Accordingly, under the condition of high line density, susceptibility to an increase in the noise level due to cross-talk is extremely increased. Thus, if the L/G pitch TP-LG is 200 nm, which is the lower limit value described above, the cross-talk noise is too high, and the SER may not be able to satisfy the criterion. Thus, with an optical disc assuming high capacity recording, the lower limit value of the L/G pitch TP-LG is preferably 220 nm.

For the reasons described above, with the optical disc 1 of the present embodiment, the track pitch (L/G pitch TP-LG) is set within the range of 250 nm to 200 nm. With respect to the groove pitch TP-GG, the range is 500 nm to 400 nm.

Of course, from the standpoint of increasing the capacity, the track pitch is preferably reduced as much as possible within the range mentioned above. Particularly, to more effectively use the advantage of adopting the land/groove recording method, the track pitch (L/G pitch TP-LG) is preferably 225 nm to 200 nm.

Also, assuming that the maximum groove pitch TP-GG of about 480 nm (the L/G pitch TP-LG of 240 nm) is preferable for a multi-layer disc with a high capacity, the track pitch (the L/G pitch TP-LG) of the optical disc 1 of the present embodiment is preferably set within the range of 240 nm to 200 nm (the groove pitch TP-GG is 480 nm to 400 nm).

Furthermore, when taking into account, with respect to the cross-talk due to an increase in the density in the line density direction, that the lower limit value of the L/G pitch TP-LG is 220 nm, the track pitch (the L/G pitch TP-LG) of the optical disc 1 is preferably set within the range of 250 nm to 220 nm (the groove pitch TP-GG is 500 nm to 440 nm).

Moreover, when taking both the multi-layer disc with a high capacity and an increase in the density in the line density direction into account, the track pitch (the L/G pitch TP-LG) of the optical disc 1 is preferably set within the range of 240 nm to 220 nm (the groove pitch TP-GG is 480 nm to 440 nm).

<3. Groove Depth>

Next, the range of the groove depth will be described. With the optical disc 1 of the present embodiment, the groove depth is set within the range of 30 nm to 5 nm.

First, 30 nm, which is the upper limit, will be described with reference to FIG. 6.

As the groove depth increases, incident light becomes less likely to reach the recording track at the back (the groove track). This is schematically shown in C of FIG. 6, and the land L becomes the obstacle to the light entering the groove G.

In this manner, the groove depth greatly affects the recording property and the reproduction property.

Figure 6:
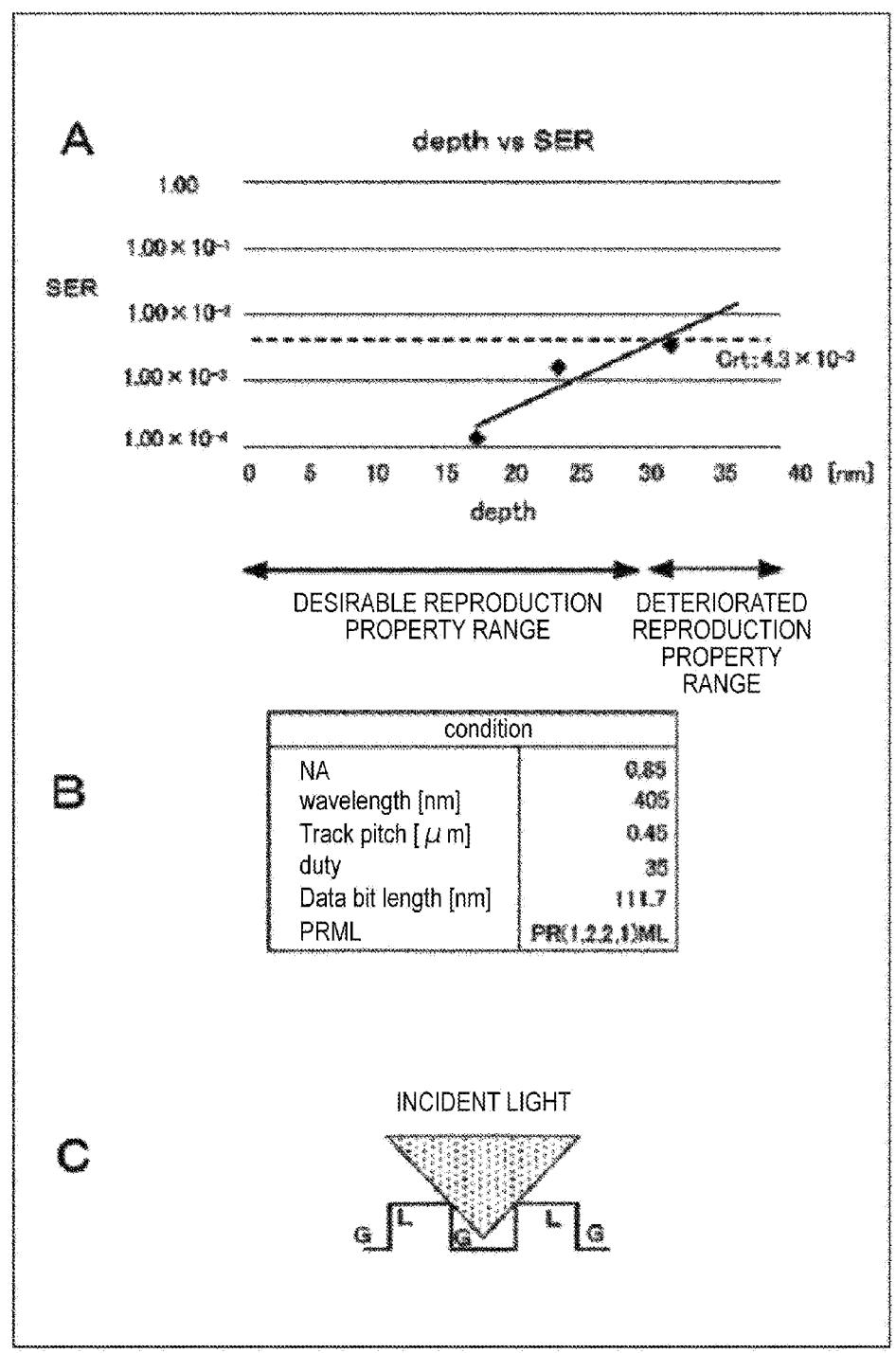
FIGS. 6A through 6C is an explanatory diagram of an upper limit of a groove depth of the embodiment.

The result of measurement of the SER with respect to the groove depth is shown in A of FIG. 6.

The conditions at the time of measurement are, as shown in B of FIG. 6, the NA=0.85, the laser wavelength $\lambda$=405 nm, the track pitch (in this case, the groove pitch TP-GG)=0.45 μm, the duty=35, and the data bit length=111.7, and PR(1,2,2,1)ML is used as the partial response decoding process.

As in the case of A of FIG. 5 described above, SER=$4.3 \times 10^{-3}$ is established as the criterion Crt.

As can be seen from A of FIG. 6, the SER exceeds the criterion when the groove depth is near 30 nm.

Accordingly, from the standpoint of the reproduction property, the upper limit of the groove depth is made 30 nm.

Next, the lower limit of the groove depth will be described with reference to FIG. 7.

Ultimately, the minimum value of the groove depth is more than 0 nm. This is because the land/groove structure does not exist at 0 nm, and the land/groove structure is present at more than 0 nm.

That said, the land/groove structure has to be such that the tracking servo may be appropriately performed for recording/reproduction. Accordingly, as in the case of A of FIG. 4 described above, the NPP value of 0.2 (the minimum level for the servo property) is made a criterion.

Figure 7:
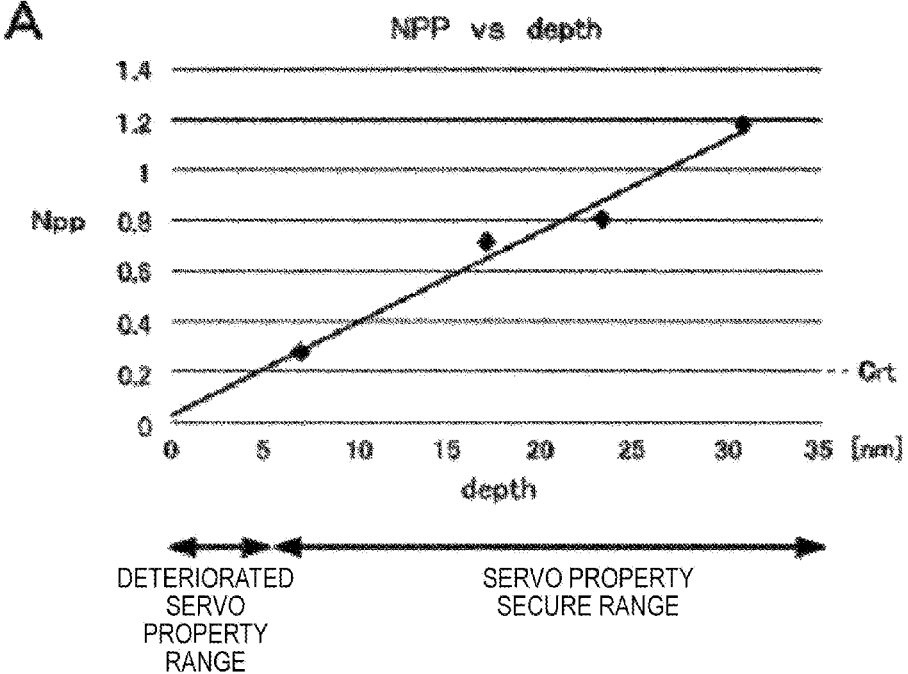
FIGS. 7A and 7B is an explanatory diagram of a lower limit of a groove depth of the embodiment.

The measurement value of the NPP with respect to the groove depth is shown in A of FIG. 7.

The conditions at the time of measurement are, as in B of FIG. 7, the NA=0.85, the laser wavelength $\lambda$=405 nm, the track pitch (in this case, the groove pitch TP-GG)=0.45 μm, and the duty=50.

As can be seen from A of FIG. 7, when the groove depth is less than 5 nm, the NPP value is 0.2 or lower, and the servo property is deteriorated.

Accordingly, with the optical disc 1 of the present embodiment, the lower limit of the groove depth is 5 nm.

That is, the groove depth is within the range of 30 nm to 5 nm.

In reality, however, when the groove G reaches the depth of 30 nm, some issues may arise even though the SER satisfies the criterion. For example, with respect to a laser power, since light does not easily reach the concave groove G, high power irradiation is required. With a multi-layer disc, the power necessary with respect to the groove G which is a concave portion of the recording layer (the layer L0) least easily reached by the light is extremely high.

Also, with a pattern where the groove depth is 30 nm, the amplitude of reproduction light is already great in a nonrecording state (for example, the NPP value is great). This leads to the stray light problem for the multi-layer disc. The stray light refers to the problem of reflected light entering a recording layer 3 which is being focused and where signal reproduction is being performed, from another recording layer 3 (a layer that is adjacent across the intermediate layer 5). The spot at the other recording layer 3 is completely off the focusing point, but the amplitude dependent of the pattern enters the reproduction light as the reflected light. In the case the groove depth is 30 nm, the amount of amplitude of the stray light entering is great, and a bad influence is exerted as a noise source.

As described above, the upper limit of the groove depth is preferably 25 nm. Particularly, with a multi-layer disc, the upper limit is preferably 25 nm. In this aspect, the groove depth is conceivably within the range of 25 nm to 5 nm.

Also, the value 0.2 of the NPP value, which is the criterion regarding the lower limit, is the minimum value, and when taking into account the margin for products (the allowance for variations) from the standpoint of manufacturing, the groove depth of 7 nm is necessary. Therefore, the groove depth is conceivably within the range of 30 nm to 7 nm, or within the range of 25 nm to 7 nm.

<4. Land/Groove Duty>

Next, the duty of the land/groove structure will be described. The duty is within the range of 50 to 5.

First, 50, which is the upper limit, will be described with reference to FIG. 8.

Duty={(land width)/(groove pitch)}×100 is true.

Accordingly, if the duty value is high, the land width is increased within the range of the groove pitch TP-GG. That is, if the duty is 50, the land width is equal to the groove width (each being a half width). Then, if the duty is over 50, the land width is greater than the groove width, and if the duty is below 50, the groove width is greater than the land width.

The incident light less easily enters the groove track on the back as the value of the duty is increased. In this manner, the duty value greatly affects the recording property and the reproduction property.

Figure 8:
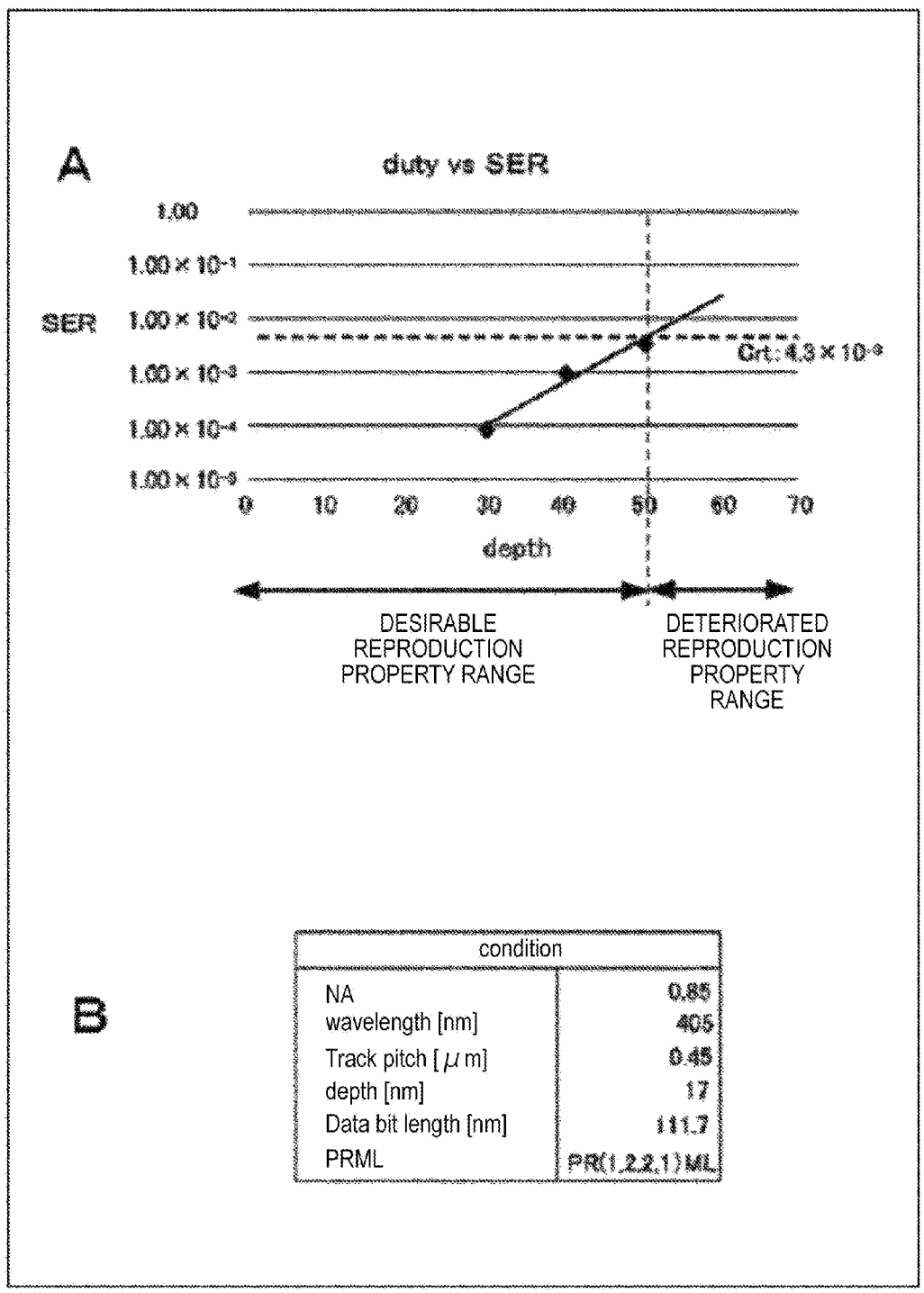
FIGS. 8A and 8B is an explanatory diagram of an upper limit of a duty of the embodiment.

The result of measurement of the SER with respect to the duty is shown in A of FIG. 8.

The conditions at the time of measurement are, as shown in B of FIG. 8, the NA=0.85, the laser wavelength λ=405 nm, the track pitch (in this case, the groove pitch TP-GG)=0.45 μm, the groove depth=17 nm, and the data bit length=111.7, and PR(1,2,2,1)ML is used as the partial response decoding process.

As in the case of A of FIG. 5 and A of FIG. 6 described above, SER=4.3×10$^{-3}$ is established as the criterion Crt.

As can be seen from A of FIG. 8, the SER exceeds the criterion when the duty exceeds 50.

Accordingly, from the standpoint of the reproduction property, the upper limit of the duty is made 50.

Next, the lower limit of the duty will be described with reference to FIG. 9.

As a matter of course, also with respect to the duty, the land/groove structure is required so that the tracking servo may be appropriately performed for recording/reproduction.

Thus, to specify the lower limit of the duty, the NPP value of 0.2 (the minimum level for the servo property) is made the criterion, as in the case of A of FIG. 4 and A of FIG. 7 described above.

Figure 9:
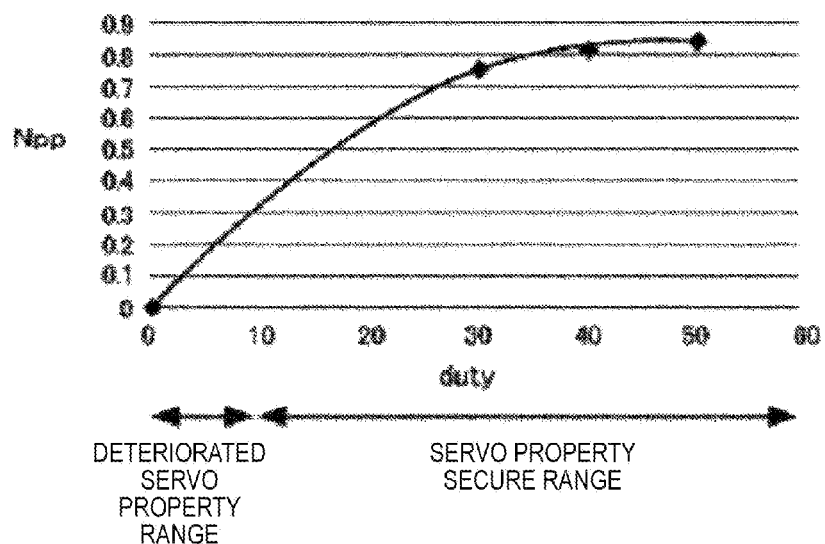
FIGS. 9A and 9B is an explanatory diagram of a lower limit of a duty of the embodiment.

The measurement value of the NPP with respect to the duty is shown in A of FIG. 9.

The conditions at the time of measurement are, as in B of FIG. 9, the NA=0.85, the laser wavelength λ=405 nm, the track pitch (in this case, the groove pitch TP-GG)=0.45 μm, and the groove depth=17 nm.

As can be seen from A of FIG. 9, when the duty is less than 5, the NPP value is 0.2 or lower, and the servo property is deteriorated.

Accordingly, with the optical disc 1 of the present embodiment, the lower limit of the duty is made 5.

Additionally, for example, when the groove pitch TP-GG is 450 nm, the duty is 5, and the land width is about 22 nm. This is difficult from the standpoint of disc manufacturing process. Currently, according to the disc exposure technique, the minimum width is about 100 nm. Accordingly, realistically, the lower limit value of the duty is appropriately made 20. In this sense, the duty is conceivably within the range of 50 to 20.

<5. Wobbling Amplitude>

As described above, according to the optical disc 1 of the present embodiment, the groove G is wobbled, and address information and the like is recorded in the wobbling groove.

At the time of recording in the optical disc 1, the address is detected from the reflected light information obtained from the wobbling groove.

Figure 10:
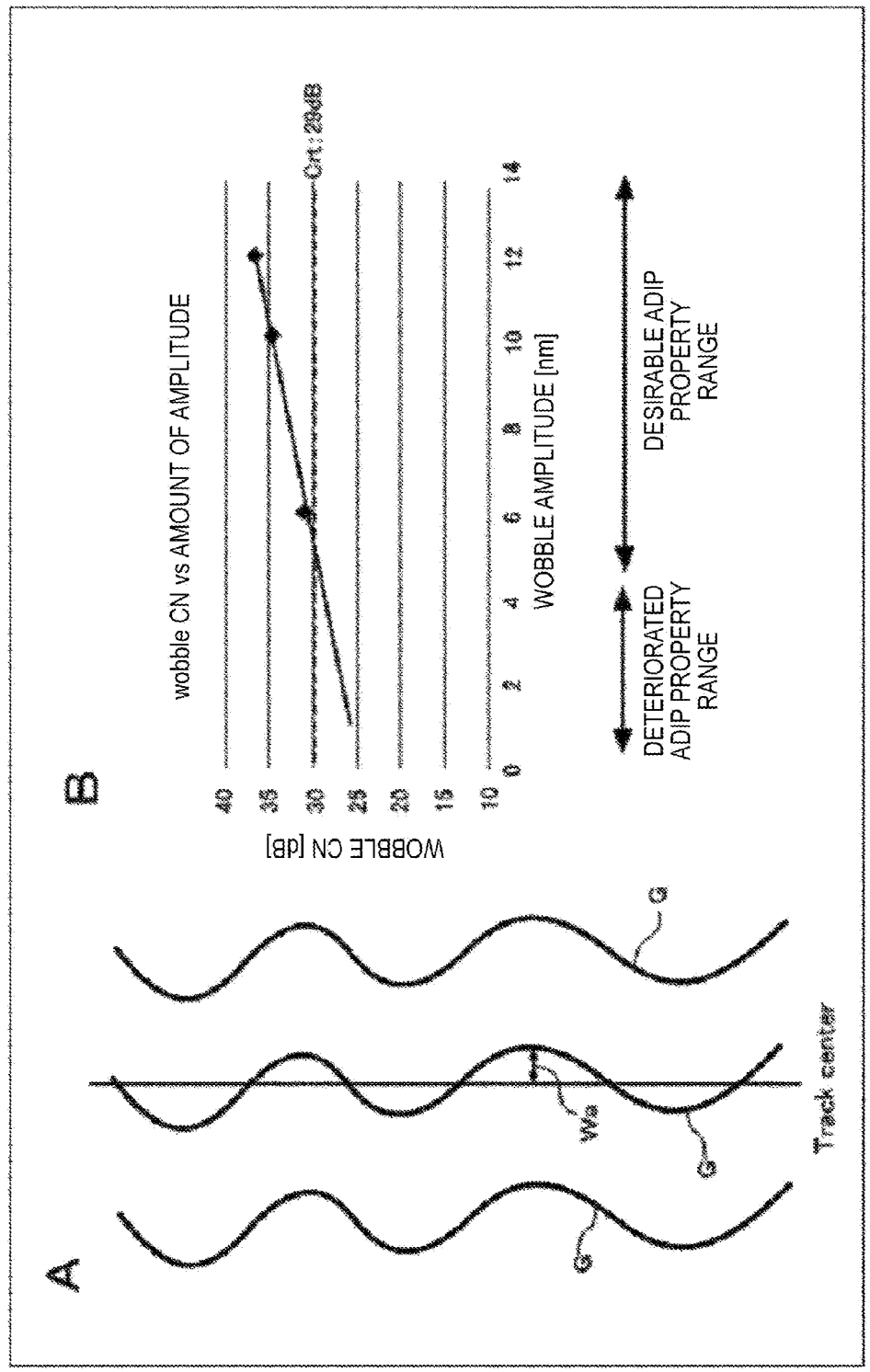
FIGS. 10A and 10B is an explanatory of a wobbling amplitude of the embodiment.

Wobbling of the groove G is schematically shown in A of FIG. 10. A wobbling amplitude Wa of the groove G, that is, the range of left/right swing from the track center, determines the readability of the address information and the like.

As the wobbling amplitude Wa, the amount of amplitude which is 29 dB or more when measured by spectrum analyzer is necessary. Moreover, the upper limit is not particularly specified.

The measurement result of a wobble CN (Carrier Noise Ratio) with respect to the wobbling amplitude Wa is shown in B of FIG. 10.

In this measurement, the carrier of the wobbling is 956.5 kHz and the noise component is 500 kHz, and the wobble CN [dB] is the ratio between the carrier level and the noise level in a state of 1× reproduction.

As can be seen from the drawing, the wobbling amplitude is about 5 nm, and is below the criterion of 29 dB. Accordingly, the wobbling amplitude Wa is minimum 5 nm.

Now, according to the optical disc 1 of the present embodiment, the back side of the concavo-convex pattern, seen from the side of the laser light incident surface, is the groove G, and the forward side is the land L. Also, the groove on the back side is wobbled.

This takes into account the reproduction property in the case of the land/groove recording method.

For example, as an example structure, it is also conceivable to wobble the side of the land L (the forward side of the concavo-convex pattern seen from the side of the laser light incident surface) of the present embodiment.

However, in the case of the land/groove recording method of the present embodiment, it is desirable that the back side (the groove G) is wobbled.

Additionally, as described above, in the present specification, the forward side and the back side of the concavo-convex pattern, seen from the side of the laser light incident surface, are referred to as "land" and "groove", respectively, for the sake of description, but the one to be wobbled may be referred to as the "groove" regardless of whether it is on the forward side or the back side. Note that, in this case, a case where the land L on the forward side, in the present specification, is wobbled may be referred to as an "on-groove", and a case where the groove G on the back side, in the present specification, is wobbled may be referred to as an "in-groove".

Now, the laser light less easily enters the back side of the concavo-convex pattern, seen from the side of the laser light incident surface, compared to the forward side, and the reproduction signal property is deteriorated for the back side compared to the forward side.

Also, in the case of wobbling one of the land and the groove, the track width of one of them is constant at all times, but the track width of the other is varied.

As has been described with reference to B of FIG. 1, in the case the groove G is wobbled, as in the present embodiment, the width GW of the groove G is constant, but the width LW of the land L is varied as shown by the widths LW1 and LW2 in B of FIG. 1. That is, an "anti-node" portion such as the width LW2 and a "node" portion such as the width LW1 are generated.

That is, when one of the land L and the groove G is wobbled, the reproduction property of the one that is not wobbled is deteriorated due to the variation in the track width due to the pattern of the anti-node and the node, because a modulation signal component is superimposed on the reproduction signal even if there is no recording.

If the land L on the forward side, seen from the side of the laser light incident surface, is to be wobbled, a desirable reproduction signal property may be obtained with respect to the reproduction signal from the land track because the land is on the forward side and the track width is constant. However, on the side of the groove G, the reproduction signal property is greatly deteriorated because the groove is on the back side and the track width is varied.

Thus, the balance between the reproduction signal qualities of the land track and the groove track becomes very poor.

Accordingly, in the present embodiment, the groove G on the back side is wobbled such that the groove G is disadvantageous in that it is on the back side but is advantageous in that the track width is constant, and such that the land L is advantageous in that it is on the forward side but is disadvantageous in that the track width is varied. That is, factors that deteriorate the reproduction signal property are desirably distributed to the land L and the groove G so as to achieve a balance regarding the reproduction signal qualities of the land track and the groove track, and to prevent the quality of one of the reproduction signals from becoming extremely poor.

Figure 11:
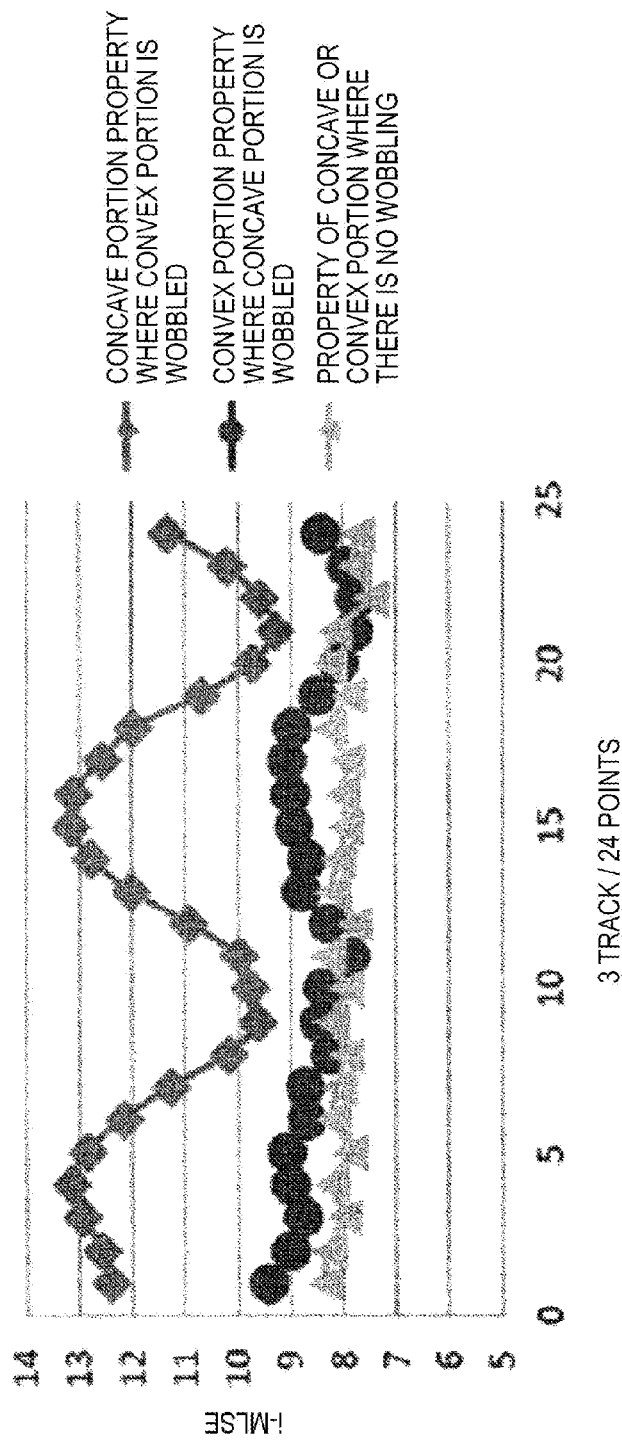
FIG. 11 is an explanatory diagram of an advantage of concave wobbling.

FIG. 11 shows variations in the signal quality due to wobbling. As the evaluation value of the signal quality, an i-MLSE value of an optical disc evaluation method that uses the PRML method is used.

The graph of FIG. 11 is obtained by measuring the evaluation value i-MLSE for each point by dividing three continuous recorded tracks into twenty-four.

The measurement value of ♦ is the recording/reproduction property of a concave portion (the groove G) when a convex portion (the land L) is wobbled.

The measurement value of ● is the recording/reproduction property of the convex portion (the land L) when the concave portion (the groove G) is wobbled.

The measurement value of ▲ is the recording/reproduction property of the concave portion or the convex portion where there is no wobbling.

In the cases where the convex portion and the concave portions are wobbled, i-MLSE is deteriorated due to the leakage of the wobble frequency compared to the case where there is no wobbling, but it is clear from FIG. 11 which of a case of wobbling the convex portion and a case of wobbling the concave portion is more advantageous.

When the convex portion is wobbled, the pattern of the anti-node and the node of the convex portion prevents light from entering at the time of laser light entering the concave portion, and the recording property is significantly deteriorated, and also at the time of reproduction, a spectrum corresponding to the wobble frequency is superimposed on the returning light, and the i-MLSE property is significantly deteriorated. Additionally, there is a variation in the i-MLSE because there is one portion where the anti-node and the node are most present for one cycle.

On the other hand, when the concave portion is wobbled, although there is the anti-node/node pattern on the convex portion (the land L) as shown in B of FIG. 1, this is on the forward side with respect to the incident light, and this does not become an obstacle at the time of recording. Thus, this does not result in deterioration in the recording property. At the time of reproduction, a spectrum corresponding to the wobble frequency is superimposed on the returning light, but the deterioration is suppressed to about 1% compared to the case of no wobbling.

As described above, in the present embodiment, it is desirable to wobble the groove G on the back side.

However, it is also conceivable to wobble the land L on the forward side if the recording/reproduction property is sufficiently good due to various factors.

<6. Disc Drive Device>

Next, an example structure of a disc drive device for performing recording/reproduction on the optical disc 1 of the present embodiment will be described with reference to FIG. 12.

The optical disc 1 of the present embodiment is placed on a turntable, not shown, installed on the disc drive device, and is rotated at a constant linear velocity (CLV) or at a constant angular velocity (CAV) by a spindle motor 22 at the time of an recording/reproduction operation.

At the time of reproduction, mark information recorded in the recording tracks (the land track and the groove track) on the optical disc 1 is read out by an optical pickup (an optical head) 21.

Also, at the time of recording data in the optical disc 1, user data is recorded as mark arrays in the recording tracks on the optical disc 1 by the optical pickup 21.

Additionally, ADIP (Address in Pregroove) information embedded as the wobbling of the groove track on the optical disc 1 is also read out from the optical disc 1 by the optical pickup 21.

A laser diode which is a laser light source, a photodetector for detecting laser light, an objective lens which is an output end for laser light, an optical system for irradiating laser light on the disc recording surface via the objective lens and for guiding the reflected light to the photodetector, and the like, are formed inside the optical pickup 21.

The objective lens is held inside the optical pickup 21 by a two-axis mechanism in such a way as to be movable in the tracking direction and the focus direction.

Also, the entire optical pickup 21 is movable in the disc radial direction by a thread mechanism 23.

Furthermore, the laser diode in the optical pickup 21 is driven to irradiate laser by the drive current from a laser driver 13.

Reflected light information from the optical disc 1 is detected by the photodetector, and is made an electrical signal according to the amount of received light and is supplied to a matrix circuit 24.

The matrix circuit 24 includes a current/voltage conversion circuit with respect to the output current from a plurality of light receiving elements as the photodetector, a matrix calculation/amplification circuit, and the like, and generates a necessary signal by a matrix calculation process.

For example, a reproduced information signal (an RF signal) corresponding to reproduced data, a focus error signal and a tracking error signal for servo control, and the like are generated.

Furthermore, a push-pull signal is generated as a signal according to wobbling of the groove, that is, a signal for detecting wobbling.

The reproduced information signal output from the matrix circuit 24 is supplied to a data detection processing unit 25 via a cross-talk cancellation circuit 19. Also, the focus error signal and the tracking error signal output from the matrix circuit 24 are supplied to an optical block servo circuit 11.

The cross-talk cancellation circuit 19 performs a cross-talk cancellation process on the RF signal. The optical disc 1 of the present embodiment adopts the land/groove recording method, and the track pitch (the L/G pitch TP-LG) is extremely narrow.

The narrower the track pitch, the more the cross-talk components of an adjacent track is mixed at the time of reproduction. Thus, the cross-talk cancellation circuit 19 is provided, and a process of cancelling the RF signal component of the adjacent track is performed.

Additionally, depending on the format (the track pitch or the like) of the recording track of the optical disc 1, it may not be necessary to provide the cross-talk cancellation circuit 19.

The data detection processing unit 25 performs a binarization process on the reproduced information signal.

For example, the data detection processing unit 25 obtains a binary data array by a partial response maximum likelihood decoding process (a PRML detection method: a Partial Response Maximum Likelihood detection method) by performing, on the RF signal, an A/D conversion process, a reproduction clock generation process by PLL, a PR (Partial Response) equalization process, a Viterbi decoding (a maximum likelihood decoding) or the like. For example, it is conceivable to use PR(2,3,3,3,2)ML.

Then, the data detection processing unit 25 supplies the binary data array, as the information read out from the optical disc 1, to an encoding/decoding unit 27 in a later stage.

The encoding/decoding unit 27 performs demodulation of reproduced data at the time of reproduction, and performs a modulation process on recording data at the time of recording. That is, at the time of reproduction, data demodulation, deinterleaving, ECC decoding, address decoding and the like are performed, and at the time of recording, ECC encoding, interleaving, data modulation and the like are performed.

At the time of reproduction, the binary data array decoded by the data detection processing unit 25 is supplied to the encoding/decoding unit 27. The encoding/decoding unit 27 performs a demodulation process on the binary data array, and obtains reproduced data from the optical disc 1. For example, a demodulation process and an ECC decoding process of performing error correction are performed on data on which a run length limited code modulation such as RLL(1, 7)PP modulation (RLL: Run Length Limited, PP: Parity preserve/Prohibit rmtr (repeated minimum transition run length)) has been performed and which has been recorded in the optical disc 1, and reproduced data from the optical disc 1 is obtained.

Data which has been decoded to be the reproduced data by the encoding/decoding unit 27 is transferred to a host interface 28, and is transferred to a host appliance 100 based on an instruction from a system controller 10. The host appliance 100 is a computer device or an AV (Audio-Visual) system appliance, for example.

At the time of recording/reproduction of the optical disc 1, the ADIP information is processed.

That is, a push-pull signal output from the matrix circuit 24 as a signal regarding wobbling of the groove is made into digitalized wobble data by a wobble signal processing circuit 26. Also, a clock that is synchronous with the push-pull signal is generated by the PLL process.

The wobble data is demodulated into a data stream constituting the ADIP address by an ADIP demodulation circuit 16 and is supplied to an address decoder 29.

The address decoder 29 performs decoding on the supplied data, obtains an address value, and supplies the same to the system controller 10.

At the time of recording, recording data is transferred from the host appliance 100, and this recording data is supplied to the encoding/decoding unit 27 via the host interface 28.

In this case, as an encoding process on the recording data, the encoding/decoding unit 27 performs addition of an error correction code (the ECC encoding), interleaving, addition of a sub code, and the like. Also, the run length limited code modulation such as the RLL(1-7)PP method is performed on data on which the processes mentioned above have been performed.

The recording data which has been processed by the encoding/decoding unit 27 is supplied to a write strategy unit 14. The write strategy unit 14 performs, as a recording compensation process, a laser driving pulse waveform adjustment with respect to the property of a recording layer, the spot shape of laser light, a recording linear velocity, and the like. Then, the laser driving pulse is output to the laser driver 13.

The laser driver 13 feeds a current to the laser diode within the optical pickup 21 based on the laser driving pulse on which the recording compensation process has been performed, and causes laser to be irradiated. A mark according to the recording data is thereby formed on the optical disc 1.

Additionally, the laser driver 13 includes a so-called APC (Auto Power Control) circuit, and performs control such that the output of laser is not dependent on temperature and the like and is constant, while monitoring laser output power based on output of a detector for monitoring laser power provided in the optical pickup 21.

The target values of laser output at the time of recording and at the time of reproduction are provided by the system controller 10, and laser output levels are controlled to the target values at the time of recording and at the time of reproduction.

The optical block servo circuit 11 generates various servo drive signals for focus, tracking, and thread from the focus error signal and tracking error signal from the matrix circuit 24 to execute a servo operation.

That is, a focus drive signal and a tracking drive signal are generated according to the focus error signal and the tracking error signal, and a focus coil and a tracking coil of the two-axis mechanism within the optical pickup 21 are driven by a two-axis driver 18. Thus, a tracking servo loop and a focus servo loop according to the optical pickup 1, the matrix circuit 24, the optical block servo circuit 11, the two-axis driver 18, and the two-axis mechanism are formed.

Also, the optical block servo circuit 11 turns off the tracking servo loop according to a track jump command from the system controller 10, and outputs a jump drive signal, to thereby execute a track jump operation.

Also, the optical block servo circuit 11 generates a thread drive signal based on a thread error signal obtained as a low-frequency component of the tracking error signal, access execution control from the system controller 10, or the like, and drives the thread mechanism 23 by a thread driver 19. Although not shown in the drawing, the thread mechanism 23 includes a mechanism configured from a main shaft holding the optical pickup 21, a thread motor, a transmission gear, and the like, and drives the thread motor according to the thread drive signal, to thereby perform required slide movement of the optical pickup 21.

A spindle servo circuit 12 performs control of CLV rotating the spindle motor 22.

The spindle servo circuit obtains a clock generated by the PLL process on a wobble signal as rotation velocity information of the current spindle motor 2, and compares the same with CLV reference velocity information, to thereby generate a spindle error signal.

Also, at the time of data reproduction, a regenerated clock generated by the PLL inside the data signal processing circuit 25 is made rotation velocity information of the current spindle motor 22, and thus, this information may be compared with the predetermined CLV reference velocity information so as to generate the spindle error signal.

Then, the spindle servo circuit 12 outputs a spindle drive signal generated according to the spindle error signal, and causes a spindle driver 17 to CLV rotate the spindle motor 22.

Also, the spindle servo circuit 12 generates a spindle drive signal according to a spindle kick/brake control signal from the system controller 10, and executes operations such as activation, stop, acceleration, deceleration and the like of the spindle motor 22.

Additionally, the spindle motor 22 is provided with an FG (Frequency Generator) or a PG (Pulse Generator), for example, and output thereof is supplied to the system controller 10. The system controller 10 may thereby recognize rotation information (rotation velocity, a rotation angle position) of the spindle motor 22.

Various operations of a servo system and a recording/reproduction system as described above are controlled by the system controller 10 formed of a microcomputer.

The system controller 10 executes various processes according to commands from the host appliance 100 provided via the host interface 8.

For example, if a write command is output from the host appliance 100, the system controller 10 first moves the optical pickup 21 to the address to be written. Then, the encoding process is performed as described above, by the encoding/decoding unit 27, on the data (for example, video data, audio data, or the like) transferred from the host appliance 100. Then, recording is performed by the laser driver 13 performing driving to irradiate laser according to the data encoded in the manner described above.

Furthermore, for example, in a case a read command requesting transfer of certain data recorded in the optical disc 1 is supplied from the host appliance 100, the system controller 10 first performs seek operation control with the specified address as an object. That is, a command is output to the optical block servo circuit 11 so as to perform an access operation of the optical pickup 21 with the address specified by the seek command as a target.

Then, operation control necessary for transferring data of a data section specified to the host appliance 100 is performed. That is, data is read out from the optical disc 1, and reproduction processes are performed by the data detection processing unit 25 and the encoding/decoding unit 27, and requested data is transferred.

Figure 12:
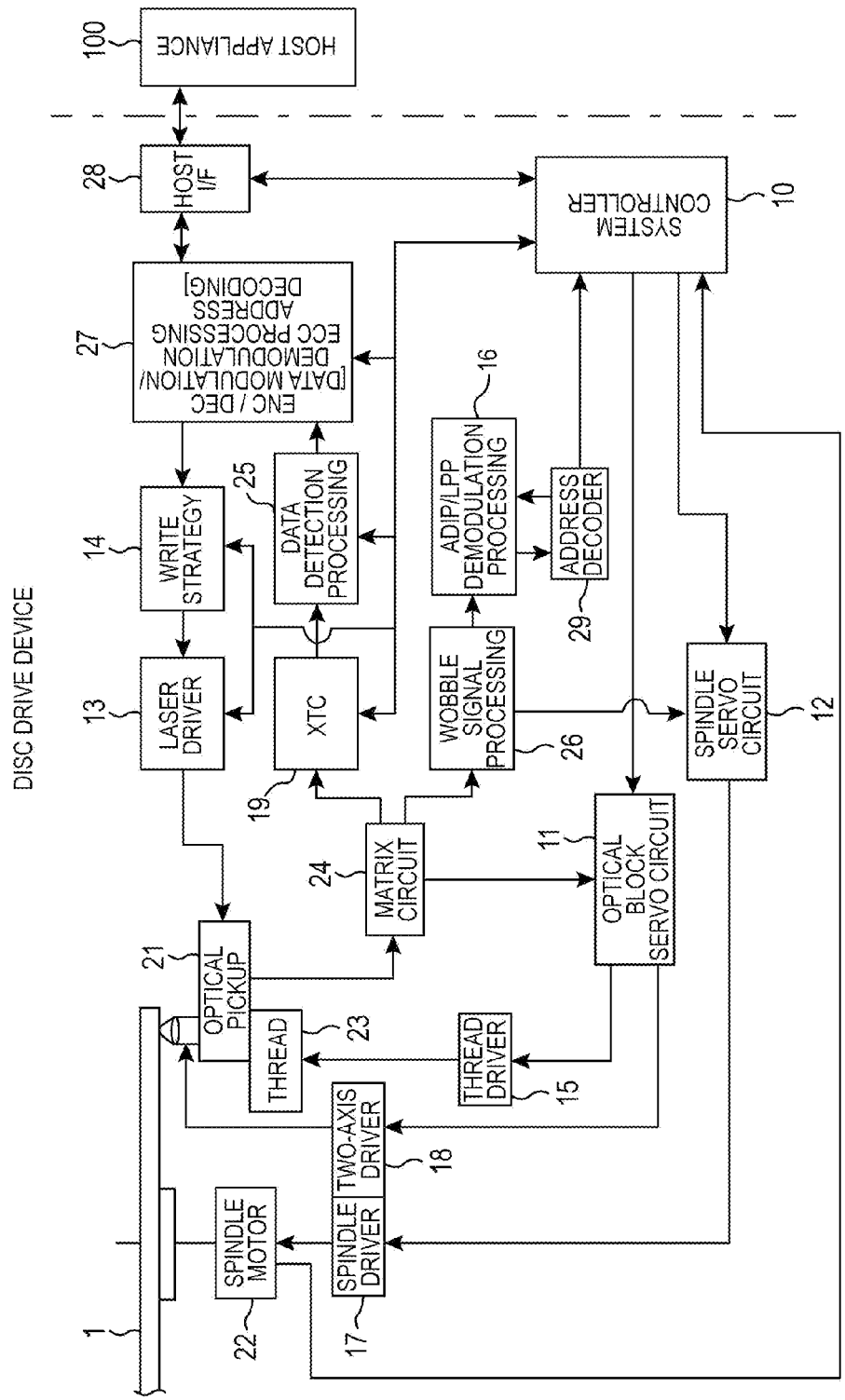
FIG. 12 is a block diagram of a disc drive device for an optical disc of the embodiment.

Additionally, the example in FIG. 12 describes a disc drive device that is to be connected to the host appliance 100, but the disc drive device does not have to be connected to another appliance. In this case, an operation unit or a display unit may be provided, or the structure of the interface portion for data input/output may be different from that of FIG. 12. That is, recording and reproduction are performed according to an operation of a user, and a terminal unit for inputting/outputting various types of data is formed. Of course, various other structures are conceivable as the disc drive device.

<7. Manufacturing Process of Optical Disc>

Next, a manufacturing process of the optical disc 1 of the present embodiment will be described. The manufacturing process of the optical disc 1 is shown in FIG. 13

Figure 13:
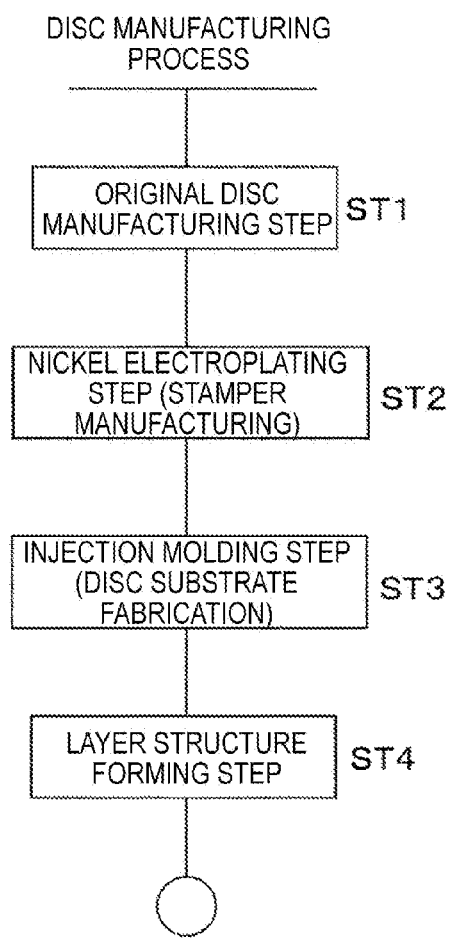
FIG. 13 is a flow chart of a manufacturing process of an optical disc of the embodiment.

As shown in FIG. 13, the manufacturing process is roughly divided into the following:

Step ST1: Original Disc Manufacturing Step
Step ST2: Nickel Electroplating Step
Step ST3: Injection Molding Step
Step ST4: Layer Structure Forming Step In the original disc manufacturing step in step ST1, an exposure technique combining BLD (Blue Laser Diode) and inorganic resist called PTM (Phase Transition Mastering) is used to fabricate an original disc having a land/groove structure according to the track pitch range, the duty range and the groove depth range described above.

In reality, an original disc whose groove pitch TP-GG is, for example, 0.45 µm, duty is about 30 to 40, and groove depth is, for example, 17 nm is fabricated.

According to the PTM, an inorganic resist formed on an original disc substrate is exposed in heat mode, and a groove pattern is drawn on the original disc. Then, a development process is performed, and an original disc whose exposed portion is made into a concave groove is fabricated. Additionally, a groove pattern as wobbling grooves are formed by deflecting laser light for exposure by using a deflector such as an AOD (acousto-optic deflector) or an EOD (electro-optic deflector), for example, and according to a modulated signal such as address information or the like.

Figure 14:
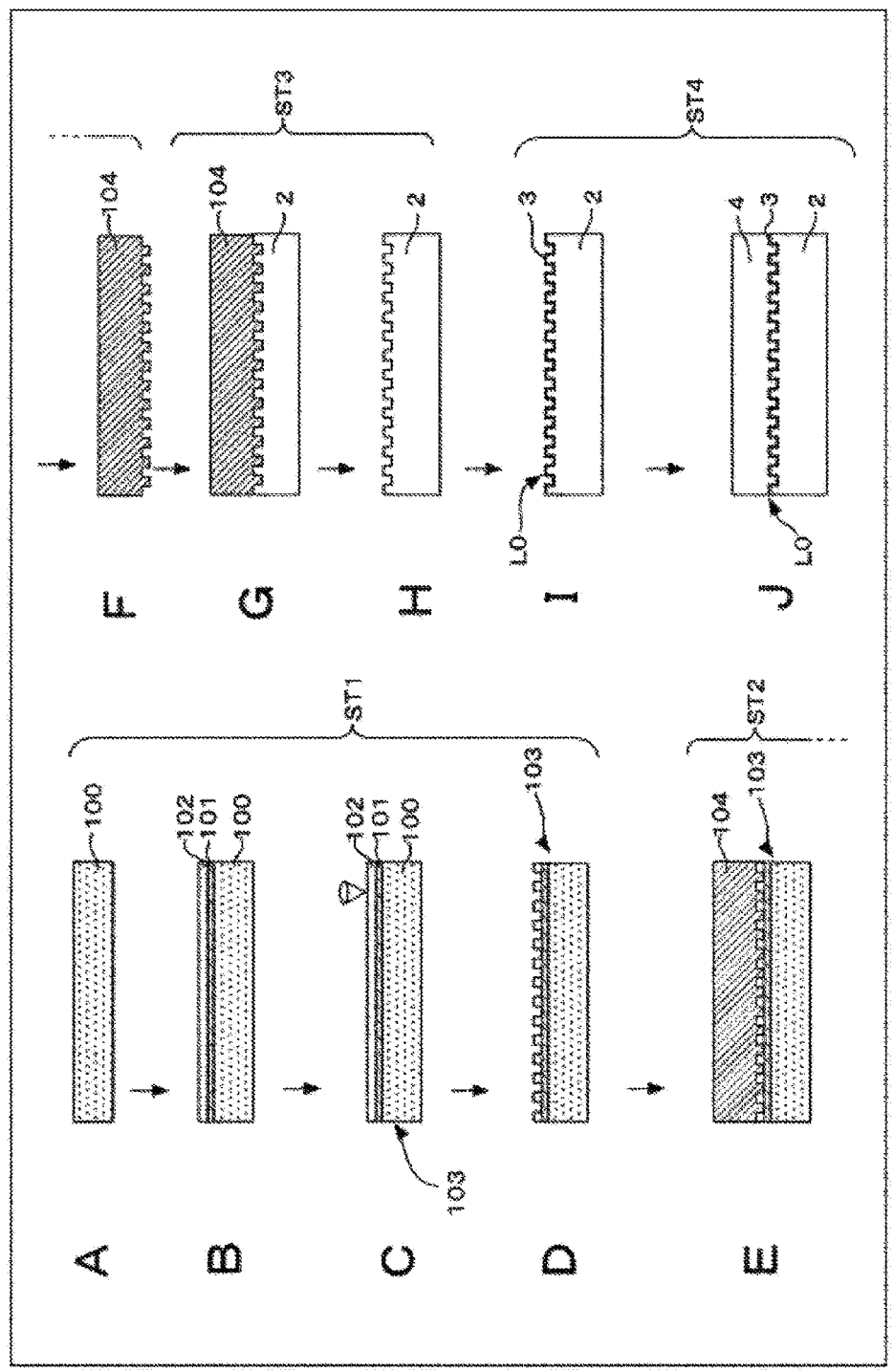
FIGS. 14A, 14B, 14C, 14D, 14E, 14F, 14G, 14H, 14I, and 14J illustrate an explanatory diagram of a manufacturing process of an optical disc of the embodiment.

The original disc manufacturing process is schematically shown in A to D of FIG. 14.

An original disc substrate 100 configuring the original disc is shown in A of FIG. 14. As the original disc substrate 100, a silicon wafer, a silica glass or the like is used, for example.

A thermal storage layer 101 and an inorganic resist layer 102 are formed on the original disc substrate 100 by a sputtering method as shown in B of FIG. 14.

Next, as shown in C of FIG. 14, the inorganic resist layer 102 is exposed by performing exposure thereon in a wobbling groove pattern by using a mastering device.

Then, the inorganic resist layer 102 is developed by organic alkaline developer, and an original disc 103 on which a land/groove pattern of a predetermined concavo-convex pattern is formed is created as shown in D of FIG. 14.

In this case, the depth of the groove to be formed is controlled by adjustment of the inorganic resist material, the thickness of the inorganic resist layer 102, or the laser power or the pulse width at the time of exposure by the mastering device.

Also, the groove pitch TP-GG and the duty may be set based on the movement speed in the radial direction of the original disc by the mastering device.

The wobbling amplitude Wa may be set based on the amount of deflection of laser light by the deflector.

The track pitch, the duty, the groove depth, and the wobbling amplitude on the original disc 103 are carried over approximately as they are to the optical disc 1 which is the end product by the following transferring.

In the nickel electroplating step in step ST2, a stamper whose concavo-convex pattern is an inverse of the original disc 103 fabricated in step ST1 is formed.

That is, as shown in E of FIG. 14, a metallic nickel film is precipitated by an electroforming process on the concavo-convex surface of the original disc 103 which has been created, and a predetermined treatment is performed on the metallic nickel film after the metallic nickel film is separated from the original disc 103, and a molding stamper 104 to which a pit array pattern of the original disc 103 has been transferred is obtained (F of FIG. 14). The portion corresponding to a groove is convex-shaped on the stamper 104.

In the injection molding step in step ST3, a large number of plastic disc substrates with inverted concavo-convex pattern are molded using the stamper 104 fabricated in the nickel electroplating step.

That is, the stamper is placed in a die, and then, as shown in G of FIG. 14, a resin disc substrate 2 with a thickness of about 1.1 mm and a diameter of 120 mm, which is made of polycarbonate, which is thermoplastic resin, is molded by injection molding and by using the stamper 104.

Then, the stamper 104 is separated, and the disc substrate 2 shown in H of FIG. 14 is fabricated. With the disc substrate 2, the concavo-convex pattern is an inverse of that of the stamper 104. That is, concave grooves are formed as with the original disc 103.

In the layer structure forming step in step ST4, a predetermined layer structure is formed on each of disc substrates 105 manufactured in great number by the injection molding.

First, as in I of FIG. 14, an inorganic film is formed by sputtering on the concavo-convex surface, that is, the surface having the land/groove pattern transferred from the stamper 104, of the disc substrate 2. Specifically, this is the recording layer 3 shown in FIG. 2. This inorganic film is formed from the dielectric films 3a and 3c for controlling heat transfer and the recording film 3b that is altered by heat.

Then, as in J of FIG. 14, a cover layer 4 of about 75 to 100 μm is generated on the side of the laser light incident surface of the recording layer 3 by a UV curable spin coat and a method of UV curing, or a sheet application method, for example. The variations in the film thickness of the cover layer 4 are, peak-to-peak, 2 μm or less.

The optical disc 1 of the present embodiment is thus manufactured. This optical disc 1 has the track pitch range, the duty range, the groove depth range, and the wobbling amplitude matching the values described above.

Additionally, a hard coat layer may be further formed on the surface of the cover layer 4, or label printing may be performed on the surface of the disc substrate 3 or a moisture-proof film may be formed thereon.

Also, in the case of the multi-layer disc as shown in B of FIG. 2, formation of the recording layer 3 and the intermediate layer 5 is performed a required number of times in the layer structure forming step ST4.

A recording/reproduction experiment has been conducted on the optical disc 1 manufactured in the manner described above.

Figure 15:
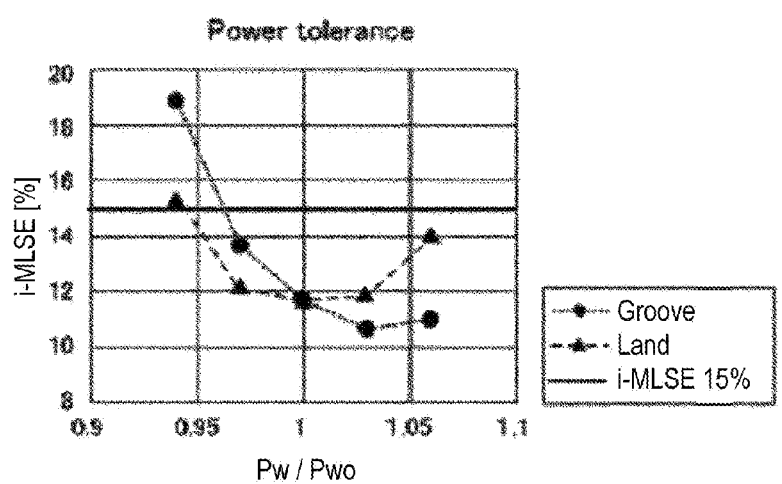
FIGS. 15A and 15B is an explanatory diagram of a recording/reproduction property of an optical disc of the embodiment.

The conditions are as shown in B of FIG. 15. The NA of the objective lens is 0.85, and the laser wavelength λ is 405 nm. The optical disc 1 is a single-layer disc, and its track pitch is 0.225 (the groove pitch TP-GG=0.45), groove depth (depth) is 17 nm, and duty is 35. The recording method is the land/groove recording method, and the modulation method is RLL (1,7)PP, the minimum data bit length is 77.68 nm, the channel clock rate is 132 MHz, and the PR class in the PRML decoding is PR(2,3,3,3,2)ML.

These are conditions for realizing recording of 51.2 GB by the optical disc 1 with a diameter of 12 cm.

As the result of the experiment, the evaluation of a reproduced signal with respect to the recording laser power is shown in A of FIG. 15. As the evaluation value, the i-MLSE value which is an evaluation method for an optical disc that uses the PRML method is used.

With respect to Pw/Pwo of the horizontal axis, Pw is the recording power, and Pwo is the optimal power. That is, Pw/Pwo=1 means that recording is performed with the optimal power, and Pw/Pwo=1.1 means that recording is performed while increasing the optimal power by 10%.

The i-MLSE values at the time of changing the recording power are shown for each of the land track and the groove track.

Additionally, with the land/groove recording method, the optimal recording power is different for the land track and the groove track depending on the entering state of the laser light or the concavo-convex pattern based on the duty and the like. In A of FIG. 15, the optical power for the land track is made the Pwo. Accordingly, with the land track, the i-MLSE value is the best when Pw/Pwo is 1.

The desired i-MLSE value is 15% or less. With respect to this point, it is shown in A of FIG. 15 that the bottom property of the i-MLSE value below 12% and a power margin of 10% or more are secured for the optical disc 1 of the present embodiment.

That is, the present embodiment has succeeded, by the land/groove recording method, in performing high-density recording of 51.2 GB per layer and in securing a certain degree of system margin.

<8. Example Modification>

Heretofore, an embodiment of the present invention has been described, but various example modifications are conceivable with respect to the optical recording medium.

In the embodiment, an example is cited according to which a groove is spirally formed, but the groove and the land may be formed concentrically.

Also, the film structure of the recording layer 3, and the layer structure of the optical disc 1 are not restricted to those shown in FIG. 2. As the recording method, various recording methods may be assumed such as phase change recording, pigment change recording, interference pattern recording, void (hole) recording, refractive-index change recording, and the like.

Furthermore, a disc-type recording medium has been described as an example, but the technology of the present disclosure is applicable also to recording media of other forms, such as a card-type recording medium and the like.

The present technology can have configurations as described below.

(1)

An optical recording medium including:

a recording layer on which a groove and a land are formed, the groove being concave and the land being convex when seen from a side of a laser light incident surface, both of the groove and the land being recording tracks where recording or reproduction of information is performed by irradiation of laser light whose wavelength is 400 nm to 415 nm by an optical system whose NA is 0.85±0.1, wherein a pitch between the groove and the land that are adjacent recording tracks is within a range of 250 nm to 200 nm.

(2)

The optical recording medium according to (1), wherein a depth of the groove with respect to the land is within a range of 30 nm to 5 nm when seen from the side of the laser light incident surface.

(3)

The optical recording medium according to (1) or (2), wherein, in a case a duty of a cross-sectional concavo-convex pattern of the groove and the land is {(land width)/(pitch between grooves)}×100, the duty is within a range of 50 to 5.

(4)
 The optical recording medium according to any of (1) to (3), wherein the groove is wobbled according to information.
(5)
 The optical recording medium according to (4), wherein an amplitude of wobbling of the groove is 5 nm or more.
(6)
 The optical recording medium according to any of (1) to (5), wherein a plurality of the recording layers are provided at different depth positions when seen from the side of the laser light incident surface.
(7)
 The optical recording medium according to any of (1) to (6), wherein the optical recording medium is a disc-shaped optical recording medium, and the groove is formed spirally or concentrically on the recording layer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Reference Signs List
1 Optical disc
2 Disc substrate
3 Recording layer
4 Cover layer
5 Intermediate layer
10 System controller
19 Cross-talk cancellation circuit
21 Optical pickup
24 Matrix circuit
25 Data detection processing unit
27 Encoding/decoding unit
103 Original disc
104 Stamper

The invention claimed is:

1. An optical recording medium comprising:
 a recording layer on which a groove and a land are formed, wherein the groove is concave and the land is convex when seen from a side of a laser light incident surface, wherein both the groove and the land are recording tracks where recording or reproduction of information is performed by irradiation of laser light whose wavelength is 400 nm to 415 nm by an optical system whose numerical aperture (NA) is 0.85±0.1,
 wherein a pitch between the groove and the land that are adjacent recording tracks is within a range of 250 nm to 200 nm, such that a symbol error rate of the recording layer does not exceed $4.3 \times 10^{-3}$ during the reproduction.

2. The optical recording medium according to claim 1, wherein a depth of the groove with respect to the land is within a range of 30 nm to 5 nm when seen from the side of the laser light incident surface.

3. The optical recording medium according to claim 1, wherein a duty of a cross-sectional concavo-convex pattern of the groove and the land is {(land width)/(pitch between grooves)}×100, and wherein the duty is within a range of 50 to 5.

4. The optical recording medium according to claim 1, wherein the groove is wobbled according to information.

5. The optical recording medium according to claim 4, wherein an amplitude of wobbling of the groove is 5 nm or more.

6. The optical recording medium according to claim 1, wherein a plurality of recording layers are provided at different depth positions when seen from the side of the laser light incident surface.

7. The optical recording medium according to claim 1, wherein the optical recording medium is a disc-shaped optical recording medium, and the groove is formed spirally or concentrically on the recording layer.

8. The optical recording medium according to claim 1, wherein the recording layers comprises a land-groove pattern adapted for a land-groove recording method.

9. The optical recording medium according to claim 1, wherein a pitch between the groove and an adjacent groove on the recording layer is within a range of 500 nm to 400 nm.

10. The optical recording medium according to claim 1, wherein a pitch between the groove and the land that are adjacent recording tracks is preferably within a range of 225 nm to 200 nm.

11. The optical recording medium according to claim 1, wherein the pitch between the groove and the land that are adjacent recording tracks is preferably within a range of 240 nm to 220 nm when a plurality of recording layers are provided.

12. The optical recording medium according to claim 1, wherein the groove is wobbled according to information such that a wobble carrier noise ratio (CN) with respect to a wobbling amplitude of the groove is greater than or equal to 29 dB.

13. The optical recording medium according to claim 1, wherein a track width of the groove is constant and a track width of the land is varied.

14. The optical recording medium according to claim 1, wherein an optical recording power for the land is different from the groove.

15. A method of manufacturing an optical recording medium, the method comprising:
 forming a groove and a land on a recording layer, wherein the groove is concave an the land is convex when seen form a laser light incident surface, wherein both the groove and the land are recording tracks where recording or reproduction of information is performed by irradiation of laser light whose wavelength is 400 nm to 415 nm by an optical system whose numerical aperture (NA) is 0.85±0.1,
 wherein a pitch between the groove and the land that are adjacent recording tracks is within a range of 250 nm to 200 nm, wherein the range of the pitch is selected such that a symbol error rate (SER) of the recording layer does not exceed $4.3 \times 10^{-3}$.

* * * * *